United States Patent
Radulescu et al.

(10) Patent No.: US 10,542,444 B2
(45) Date of Patent: Jan. 21, 2020

(54) METHODS AND APPARATUS FOR RADIO LINK MONITORING IN UNLICENSED COMMUNICATION CHANNELS

(71) Applicant: QUALCOMM Incorporated, San Diego, CA (US)

(72) Inventors: Andrei Radulescu, San Diego, CA (US); Tao Luo, San Diego, CA (US); Chirag Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/417,002

(22) Filed: Jan. 26, 2017

(65) Prior Publication Data

US 2017/0223561 A1 Aug. 3, 2017

Related U.S. Application Data

(60) Provisional application No. 62/290,365, filed on Feb. 2, 2016.

(51) Int. Cl.
*H04W 24/08* (2009.01)
*H04W 76/38* (2018.01)
(Continued)

(52) U.S. Cl.
CPC .......... *H04W 24/08* (2013.01); *H04B 17/336* (2015.01); *H04L 5/0048* (2013.01);
(Continued)

(58) Field of Classification Search
CPC ..... H04W 84/12; H04W 24/02; H04W 48/12; H04W 72/04; H04W 74/0833;
(Continued)

(56) References Cited

U.S. PATENT DOCUMENTS

| | | | |
|---|---|---|---|
| 2014/0128115 A1 | 5/2014 | Siomina et al. | |
| 2016/0095114 A1* | 3/2016 | Kim | H04W 74/0816 370/329 |
| 2017/0048690 A1* | 2/2017 | Yang | H04W 16/14 |

FOREIGN PATENT DOCUMENTS

| | | |
|---|---|---|
| EP | 2665325 A1 | 11/2013 |
| WO | WO-2014088295 A1 | 6/2014 |

(Continued)

OTHER PUBLICATIONS

Machine Translation of CN 106658584.*
International Search Report and Written Opinion—PCT/US2017/015384—ISA/EPO—dated Apr. 7, 2017.

*Primary Examiner* — Natasha W Cosme
(74) *Attorney, Agent, or Firm* — Paradice and Li LLP/Qualcomm

(57) ABSTRACT

Certain aspects of the present disclosure relate to a methods and apparatus for wireless communication. In one aspect, a method of wireless communication comprises receiving, by a long term evolution unlicensed (LTE-U) device, a plurality of signals from an access point on an unlicensed communication spectrum. The method further comprises determining, by the device, whether a signal of the plurality of signals comprises a discovery signal. The method further comprises monitoring a radio link based on, the signal if the signal is determined to comprise the discovery signal.

28 Claims, 6 Drawing Sheets

(51) Int. Cl.
  *H04B 17/336* (2015.01)
  *H04L 5/00* (2006.01)
  *H04W 48/10* (2009.01)
  *H04W 48/12* (2009.01)
  *H04W 48/16* (2009.01)
  *H04W 72/04* (2009.01)
  *H04W 48/06* (2009.01)
  *H04W 84/12* (2009.01)

(52) U.S. Cl.
  CPC ........... *H04W 48/10* (2013.01); *H04W 48/12* (2013.01); *H04W 48/16* (2013.01); *H04W 72/042* (2013.01); *H04W 76/38* (2018.02); *H04W 48/06* (2013.01); *H04W 84/12* (2013.01)

(58) Field of Classification Search
  CPC ........... H04W 56/0015; H04W 72/044; H04W 84/042; H04W 56/00; H04W 72/1268; H04W 72/1289; H04W 76/048; H04W 76/28; H04W 16/32; H04W 36/0061; H04W 36/0066
  USPC ........................................................ 370/252
  See application file for complete search history.

(56) References Cited

FOREIGN PATENT DOCUMENTS

WO  WO-2014165712 A1  10/2014
WO  WO-2015169404 A1  11/2015

\* cited by examiner

METHODS AND APPARATUS FOR RADIO LINK MONITORING IN UNLICENSED COMMUNICATION CHANNELS

CROSS REFERENCE TO RELATED APPLICATIONS

This application claims priority to U.S. Provisional Application No. 62/290,365, filed Feb. 2, 2016 and entitled "METHODS AND APPARATUS FOR RADIO LINK MONITORING IN UNLICENSED COMMUNICATION CHANNELS." The content of this prior application is considered part of this application, and is hereby incorporated by reference in its entirety.

BACKGROUND

Field

Certain aspects of the present disclosure generally relate to wireless communications, and more particularly, to methods and apparatus for radio link monitoring in unlicensed communication channels.

Background

Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), LTE Unlicensed (LTE-U), LTE Direct (LTE-D), License-Assisted Access (LAA), MuLTEfire, etc. These systems may be accessed by various types of user equipment (UE) adapted to facilitate wireless communications, where multiple UEs share the available system resources (e.g., time, frequency, and power).

For the volume and complexity of information communicated wirelessly between multiple devices, the required overhead bandwidth continues to increase. Devices may operate in close proximity to one another and operating over different radio access technologies (RATs) and/or different communication protocols. It may be desirable to coordinate, for example, communications between devices of different operators operating on a same unlicensed channel.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method of wireless communication. The method comprises receiving, by a long term evolution unlicensed (LTE-U) device, a plurality of signals from an access point on an unlicensed communication spectrum. The method further comprises determining, by the device, whether a signal of the plurality of signals comprises a discovery signal. The method further comprises utilizing, by the device, the signal for radio link monitoring if the signal is determined to comprise the discovery signal.

Another aspect of the disclosure provides an apparatus for wireless communication, such as a long term evolution unlicensed (LTE-U) device. The apparatus comprises a processor configured to receive a plurality of signals from an access point on an unlicensed communication spectrum. The processor of the apparatus is further configured to determine whether a signal of the plurality of signals comprises a discovery signal. The processor of the apparatus is further configured to utilize the signal for radio link monitoring if the signal is determined to comprise the discovery signal.

Another aspect of the disclosure provides an apparatus for wireless communication, such as a long term evolution unlicensed (LTE-U) device. The apparatus comprises means for receiving a plurality of signals from an access point on an unlicensed communication spectrum. The apparatus further comprises means for determining whether a signal of the plurality of signals comprises a discovery signal. The apparatus further comprises means for monitoring a radio link based on the signal if the signal is determined to comprise the discovery signal.

Another aspect of the disclosure provides a non-transitory computer-readable medium comprising code that, when executed, perform a method of wireless communication. The method comprises receiving, by a long term evolution unlicensed (LTE-U) device, a plurality of signals from an access point on an unlicensed communication spectrum. The method further comprises determining, by the device, whether a signal of the plurality of signals comprises a discovery signal. The method further comprises utilizing, by the device, the signal for radio link monitoring if the signal is determined to comprise the discovery signal.

DETAILED DESCRIPTION

Figure 1:
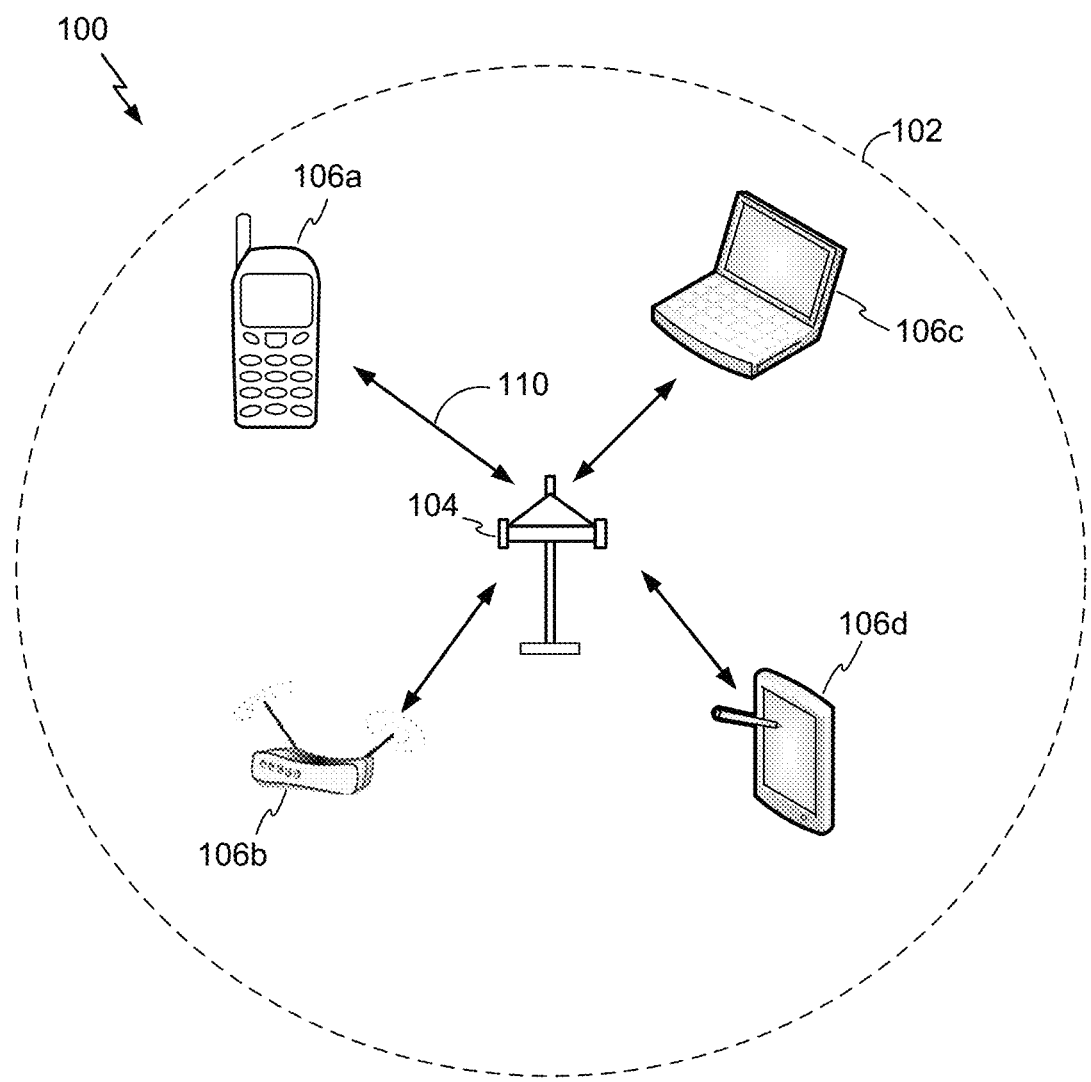
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently or combined with any other aspect of the disclosure. In addition, the scope is intended to cover such an apparatus or method which is practiced using other structure and functionality as set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein.

Wireless access network technologies may include various types of wireless local area access networks (WLANs). A WLAN may be used to interconnect nearby devices together, employing widely used access networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be: access points ("APs") and clients (also referred to as stations, or "STAs"). In general, an AP serves as a hub or a base station for the STAs in the WLAN. A STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area access networks. In some implementations an STA may also be used as an AP.

An access point ("AP") may comprise, be implemented as, or known as a NodeB, Radio Access network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a Node-B (Base-station), or any other suitable device that is configured to communicate via a wireless medium.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 is described in documents from an organization named "3rd Generation Partnership Project 2" (3GPP2). These various radio technologies and standards are known in the art.

The disclosed techniques may also be applicable to technologies and the associated standards related to LTE-A, LTE-U, LTE-D, LTE, MuLTEfire, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. MuLTEfire is an LTE-based technology that solely operates in unlicensed spectrum, and doesn't require an "anchor" in licensed spectrum. Terminologies associated with different technologies can vary. LTE-D is a device-to-device technology that utilizes the licensed LTE spectrum and was released as part of 3GPP Release 12. LTE-D devices can communicate directly with other devices by sending a message in the network allocated slot and bandwidth.

In some embodiments, depending on the technology considered, the User Equipment (UE) used in UMTS can sometimes be called a mobile station, a station (STA), a user terminal, a subscriber unit, an access terminal, etc., to name just a few. Likewise, Node B used in UMTS can sometimes be called an evolved Node B (eNodeB or eNB), an access node, an access point, a base station (BS), HRPD base station (BTS), and so forth. It should be noted here that different terminologies apply to different technologies when applicable.

FIG. 1 illustrates an example of a wireless communication system 100 (or network) in which aspects of the present disclosure may be employed. The wireless communication system 100 may include user equipment (UE) 106a-d (referred to herein as "UE 106"), which may be in wireless communication with one or both of a cellular network (e.g., a 2G, 3G, 4G LTE, LTE-U, LTE-D, and/or MuLTEfire network) through a eNB 104 or with a non-cellular network (e.g., wireless local area network (WLAN)) through the eNB 104, or some other access point (AP) (not illustrated).

The wireless communication system 100 may include operation pursuant to a wireless standard, for example the 802.11ah, 802.11ac, 802.11n, 802.11g, 802.11b, or other 802.11 based standard. As shown in FIG. 1, the eNB 104 may provide cellular communication coverage in an area 102. The UE 106 may comprise a wireless device that is located within the coverage area 102. The UE 106 may communicate with the eNB 104 over communication link 110 using a cellular network (e.g., LTE), functioning as an LTE UE. The communications exchanged between devices in the wireless communication system 100 may include data units, which may comprise packets, frames, sub-frames, bits, etc.

Broadly speaking, radio frequency (RF) spectrum may be divided into licensed and unlicensed spectrums (also referred to herein as licensed and unlicensed "bands"). In some aspects, a wireless device (e.g., UE 106 or eNB 104) operating in accordance with an LTE standard may be operating in one or both of the licensed and unlicensed spectrums. For example, a licensed spectrum can include frequencies that are reserved for cellular wireless communications (e.g., communications operating in accordance with an LTE standard). However, an unlicensed spectrum generally does not have reserved frequencies, and devices of varying capabilities may have coexisting operations within the unlicensed spectrum. For example, WLAN devices and LTE devices may both operate within an unlicensed spectrum, and may not have exclusive use of the spectrum. Thus, users of an unlicensed spectrum are subject to interference by other users. LTE devices operating in the unlicensed frequency spectrum may be referred to as "LTE-U" or "MuLTEfire" devices. As used herein, the term "LTE-U" generally refers to an LTE-based technology operating in an unlicensed (or otherwise shared between at least access points whose deployments are not fully coordinated) frequency spectrum, and—unless otherwise noted—is not meant to refer to a particular specification of one of these technologies. In some embodiments, the UE 106 may communicate with the UE 106 according to a License Assisted Access (LAA) protocol, which may use both licensed and unlicensed spectrums. However, sharing communication resources, such as the frequency spectrum and the available operating times, in wireless communications can create coexistence problems.

For example, in some aspects, the eNB 104 may communicate with the UE 106 over an unlicensed spectrum utilizing a discontinuous reception (DRX) protocol, which can provide fairness in accessing the wireless medium. However, as part of the DRX protocol, the eNB 104 may only be able to transmit certain information to all of the UEs 106 during limited periods of time. This contrasts with communications on a licensed spectrum, which generally utilizes a continuous reception protocol. Thus, communication over an unlicensed spectrum may occur less frequently, and may be slower than communication over a licensed spectrum in some instances.

In certain embodiments, the eNB 104 may attempt to communicate information to a UE 106 based on the DRX protocol during periods of time referred to as "configuration windows" or downlink monitoring transmission configuration (DMTC) windows. For example, in some aspects, the eNB 104 may transmit or broadcast anchor signals to the UE 106 during a DMTC window. In some embodiments, these anchor signals can contain basic information relevant to radio link monitoring (RLM). However, in contrast to communications on a licensed spectrum, the UE 106 may encounter additional problems in an RLM procedure. For example, for RLM in a licensed spectrum, a UE 106 may determine the quality of a plurality of pilot tones transmitted by an eNB 104 over a window of time (e.g., 200 ms). If the determined quality is below a threshold, the UE 106 may initiate a subroutine to determine whether a radio link failure (RLF) procedure is necessary (e.g., whether the UE 106 should find a new eNB 104). As part of RLM in a licensed spectrum, the eNB 104 does not have to contend for the wireless communication medium to transmit the pilot tones, and it is likely that the UE 106 will receive at least a portion of the pilot tones (regardless of their quality) if the UE 106 is still within range of the eNB 104.

In contrast, in LTE-U or MuLTEfire, the transmission of pilot tones to a UE 106 may depend upon whether or not the eNB 104 is able to secure the wireless medium, as other devices may also attempt to secure the wireless medium for their own communications at the same time as the eNB 104 (e.g., the wireless medium may be occupied). Thus, an eNB 104 may not be able to guarantee ahead of time that previously scheduled pilot tones in LTE-U or MuLTEfire will be transmitted, which may cause a UE 106 to incorrectly determine that it is out of range from the eNB 104, and in some cases, initiate an RLF procedure. Further, as in 5G, LTE-U or MuLTEfire deployment may be dense (e.g, involve many devices), and therefore, chances of the eNB 104 securing the medium for transmission may decrease. Thus, embodiments described herein relate to providing methods of RLM in an unlicensed spectrum.

Figure 2:
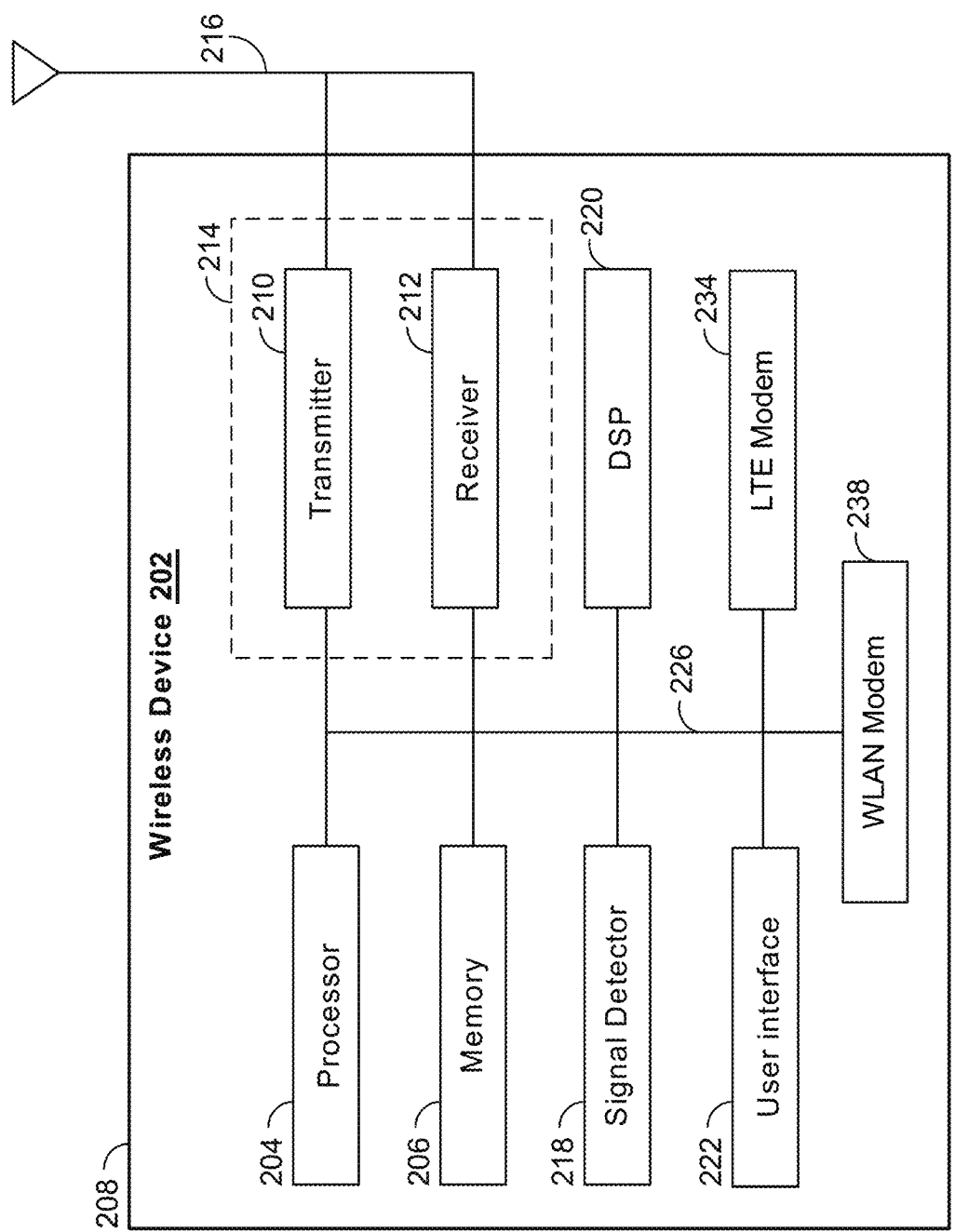
FIG. 2 illustrates various components that may be utilized in a wireless device that may be employed within the wireless communication system of FIG. 1.

FIG. 2 illustrates various components that may be utilized in a wireless device 202 for operation within the wireless communication system 100 of FIG. 1. For example, the wireless device 202 may operate as the eNB 104 or any of the UE 106. In an exemplary implementation, the wireless device 202 may be configured and used in accordance with the various methods described herein.

The wireless device 202 may include a processor 204 which controls operation of the wireless device 202. The processor 204 may also be referred to as a central processing unit (CPU) or an electronic hardware processor. Memory 206, which may include both read-only memory (ROM) and random access memory (RAM), provides instructions and data to the processor 204. The memory 206 may be an electronic hardware memory in some aspects. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. The processor 204 may further comprise a packet generator to generate packets for controlling operation and data communication.

The wireless device 202 may include a transmitter 210 and a receiver 212 to allow transmission and reception of data between the wireless device 202 and a remote location. The transmitter 210 and receiver 212 may be combined into a transceiver 214. An antenna 216 may be electrically coupled to the transceiver 214. The wireless device 202 may also include (not shown) multiple transmitters, multiple receivers, multiple transceivers, and/or multiple antennas, which may be utilized during multiple-input multiple-output (MIMO) communications, for example. In some embodiments, each of the multiple antennas may be dedicated for the transmission and/or reception of LTE-U, LTE-D, MuLTEfire, and/or WLAN communications. The wireless device may be covered by a housing unit 208.

The wireless device 202 may also comprise an LTE modem 234 for communicating with LTE devices (e.g., LTE-U, LTE-D, MuLTEfire devices). For example, the LTE modem 234 can enable the wireless device 202 to send, receive, and process LTE communications. The LTE modem 234 may contain processing capabilities to operate in both the physical (PHY) layer and the medium access control (MAC) layer for an LTE network. The wireless device 202 also comprises a WLAN Modem 238 for communicating with WLAN devices. For example, the WLAN Modem 238 can enable the wireless device 202 to send, receive, and process WLAN communications. The WLAN Modem 238 may contain processing capabilities to operate in both the physical (PHY) layer and the medium access control (MAC) layer for WLAN.

The wireless device 202 may also include a signal detector 218 that may be used in an effort to detect and quantify the level of signals received by the antenna 216, transmitter 210, receiver 212 or transceiver 214. The signal detector 218 may detect such signals in a form of detecting total energy, energy per subcarrier per symbol, power spectral density and others. The wireless device 202 may also include a digital signal processor (DSP) 220 for use in processing signals. The DSP 220 may be configured to generate a data unit for transmission. In some aspects, the data unit may comprise a physical-layer protocol data unit (PPDU). In some aspects, the PPDU is referred to as a packet. The DSP 220 may operationally connected to the processor 204 and may share resources with the processor 204.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

Various components of the wireless device 202 may be coupled together by a bus system 226. The bus system 226 may include a data bus, for example, as well as a power bus, a control signal bus, and a status signal bus in addition to the data bus. Those of skill in the art will appreciate various components of the wireless device 202 may be coupled together or accept or provide inputs to each other using some other mechanism.

Although a number of separate components are illustrated in FIG. 2, those of skill in the art will recognize that one or more of these components may be implemented not only with respect to the functionality described above, but also to implement the functionality described above with respect to other components, For example, the processor 204 may be used to implement not only the functionality described above with respect to the processor 204, but also to implement the functionality described above with respect to the signal detector 218 and/or the DSP 220. Each of the components illustrated in FIG. 2 may be implemented using a plurality of separate elements.

Figure 3:
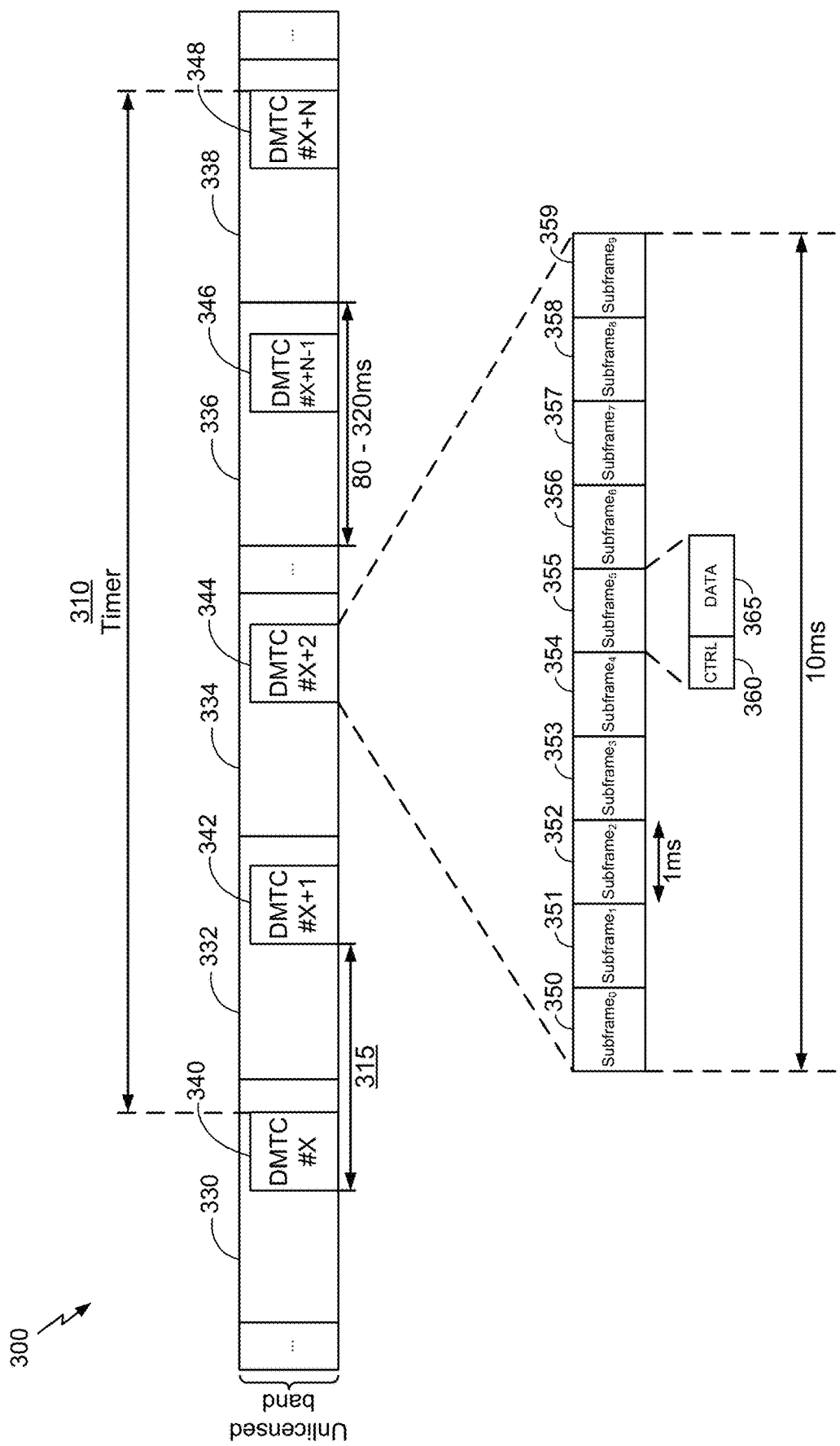
FIG. 3 illustrates an exemplary time sequence diagram of communications in an unlicensed spectrum, in accordance with an embodiment.

As noted above, the wireless device 202 may comprise the eNB 104 or the UE 106, and may be used to transmit and/or receive communications over licensed or unlicensed spectrums. Specifically, the eNB 104 or the UE 106 may comprise a WLAN, LTE-U, or MuLTEfire device configured to operate in an unlicensed spectrum. FIG. 3 illustrates an exemplary time sequence diagram 300 of communications in an unlicensed spectrum, in accordance with an embodiment. In certain embodiments, the illustrated unlicensed band can be a physical dedicated control channel (PDCCH).

As illustrated, the time sequence diagram 300 comprises a plurality of discrete transmission periods 330-338 (also referred to as "DMTC periods"). During each transmission period 330-338, devices of varying capabilities may attempt to gain access of the unlicensed spectrum to transmit data. For example, as noted above, an eNB 104 may attempt to access the wireless medium to transmit or broadcast anchor signals during a DMTC window. In some aspects, each transmission period can be 80 ms, 160 ms, or 320 ms. Although seconds and milliseconds are discussed, other variables may be utilized, such as a number of frames.

As illustrated, each of the plurality of transmission periods 330-338 can have a corresponding DMTC window 340-348. The DMTC windows 340-348 may only occur for a specified period of time. For example, in an embodiment, the DMTC window 344 may be 10 ms in length. In accordance with this embodiment, the eNB 104 may have a 10 ms window to access the wireless medium and transmit one or more anchor signals (or other signals) to listening UEs 106. In some aspects, each successive DMTC window 340-348 may be separated from other DMTC windows 340-348 by a predetermined amount of time or frames, represented by interval 315. For example, the start time of DMTC window 342 may be separated from the start time of adjacent DMTC window 340 or DMTC window 344 by 80 ms, 160 ms, or 320 ms. During the times in which a DMTC window 340-348 is not present, the UE 106 may be in a "power save," "idle" or "sleep" mode (to save energy or otherwise extend battery life), unless the UE 106 is otherwise attempting to transmit or receive information. In various aspects, each of the times described herein can be determined ahead of time (e.g., set by a specification or configuration) or may be dynamically adjusted, and can vary from one transmission period 330-338 to another.

Although one DMTC window 340-348 is illustrated for each transmission period 330-338, in an embodiment, more than one DMTC window may be scheduled for each transmission period 330-338. This may be beneficial in an emergency situation, for example, if LTE-U or MuLTEfire devices are utilized for emergency communications, as a larger portion of each transmission period 330-338 could be allocated for these communications.

As illustrated, one or more sub-frames 350-359 may be transmitted during a DMTC window 340-348. In an embodiment, the duration of each sub-frame 350-359 can be 1 ms. In some aspects, each of the sub-frames 350-359 can be anchor signals when they are transmitted by the eNB 104. Anchor signals can comprise a discovery reference signal (DRS), an enhanced discovery reference signal (eDRS), or some other signal. In some aspects, anchor signals can contain information relevant to RLM, such as a primary synchronization signal (PSS), a secondary synchronization signal (SSS), cell-specific reference signals (CRS), etc.

Each sub-frame 350-359 (e.g., anchor signal) may contain a control portion 360 and a data portion 365. In an embodiment, the control portion 360 can indicate one or more UEs 106 that the sub-frame 350-359 carries data for within the data portion 365. For example, each UE 106 may be identified by a radio network temporary identifier (RNTI). Accordingly, the control portion 360 may indicate an RNTI of the UE 106 that is the intended recipient of the sub-frame 355, for example. In some aspects, a specialized RNTI may be utilized to indicate that a sub-frame 350-359 contains broadcast information, such as a paging RNTI (P-RNTI).

During the DMTC window 340 (or before) the eNB 104 can attempt to gain access of the wireless medium to transmit anchor signals or other information to the UEs 106. In various aspects, the eNB 104 may attempt to gain access to transmit on the wireless medium through various methods of channel assessment or channel contention. For example, the eNB 104 may utilize a higher-priority medium contention mechanism to obtain access to the wireless medium during the DMTC windows 340-348. In an embodiment, the eNB 104 may utilize a one-shot listen-before-talk (LBT) mechanism.

In certain aspects, the eNB 104 may not obtain access to transmit on the wireless medium at the scheduled start time of the DMTC window 340. For example, the eNB 104 may not obtain access to transmit on the wireless medium until 6 ms after the scheduled start of the DMTC window 340. In an embodiment, the eNB 104 may then transmit sub-frames during the remaining 4 ms of the DMTC window 340 (assuming 10 ms DMTC windows are utilized). However, in certain embodiments, a UE 106 may not monitor the remaining 4 ms of the DMTC window 340 for purposes of RLM. Further, in certain aspects, the eNB 104 may not obtain access to transmit on the wireless medium during the DMTC window 340 at all, and therefore a UE 106 may not observe any information transmitted by the eNB 104.

In wireless communications on a licensed spectrum, the UE 106 can interpret the failure to detect transmissions from an eNB 104 as the eNB 104 being "out-of-sync" with the UE 106. For example, the UE 106 may be out of range of the eNB 104, or there may be some other failure at the eNB 104. However, UEs 106 in wireless communications on a licensed spectrum may also determine that it is out-of-sync with an eNB 104 if communications are detected from the eNB 104, but are not above a threshold quality. Thus, if any of these out-of-sync conditions occur, then it is possible that the UE 106 will initiate an RLF procedure and connect with a new eNB 104, regardless of the reason that the UE 106 is out-of-sync with the eNB 104.

However, in wireless communications on an unlicensed spectrum, the failure of a UE 106 to detect communications from the eNB 104 may not be due to the UE 106 being out of range of the eNB 104 or due to a failure of the eNB 104, as the eNB 104 may not always win access to the wireless medium. Thus, it may be desirable that UEs 106 do not initiate an RLF procedure based only on the failure to detect transmissions within one or more DMTC windows 340-348.

For example, in some aspects, the UE 106 can give the eNB 104 a certain amount of time to obtain access to the wireless medium after the UE 106 fails to detect any transmission from the eNB 104 during DMTC window 340. Although the DMTC window 340 is illustrated as being the first DMTC window in the time sequence diagram 300, it is possible that several DMTC windows (and transmission opportunities) have already passed. In the illustrated embodiment, the DMTC window 340 can be the $X^{th}$ DMTC window in which a UE 106 has not detected any transmissions from the eNB 104 (e.g., has not detected "sufficient" transmissions, descried in further detail below). In some aspects, the evaluation of when the $X^{th}$ DMTC window occurs may be determined based at least in part on method 400 of FIG. 4 described below. In some embodiments, the passing of transmission periods 330-338 or some other defined occurrence (e.g., a number of frames or an amount of time) may be evaluated instead of the passing of a number of DMTC windows 340-348.

In another embodiment, after the $X^{th}$ DMTC window 340 has passed and the UE 106 still has not detected any transmissions by the eNB 104, the UE 106 may wait for a timer 310 to allow the UE 106 additional time to detect transmissions from the eNB 104, before initiating an RLF procedure. For example, as illustrated, the UE 106 may utilize the timer 310 to allow for N DMTC windows 340-348 (or similarly, transmission periods 330-338, frames, time, etc.) to pass, and may initiate an RLF procedure thereafter if transmissions by the eNB 104 are not detected. In some aspects, these determinations and the use of the timer 310 may be implemented in a manner similar to the method 400 of FIG. 4 discussed below.

Figure 4:
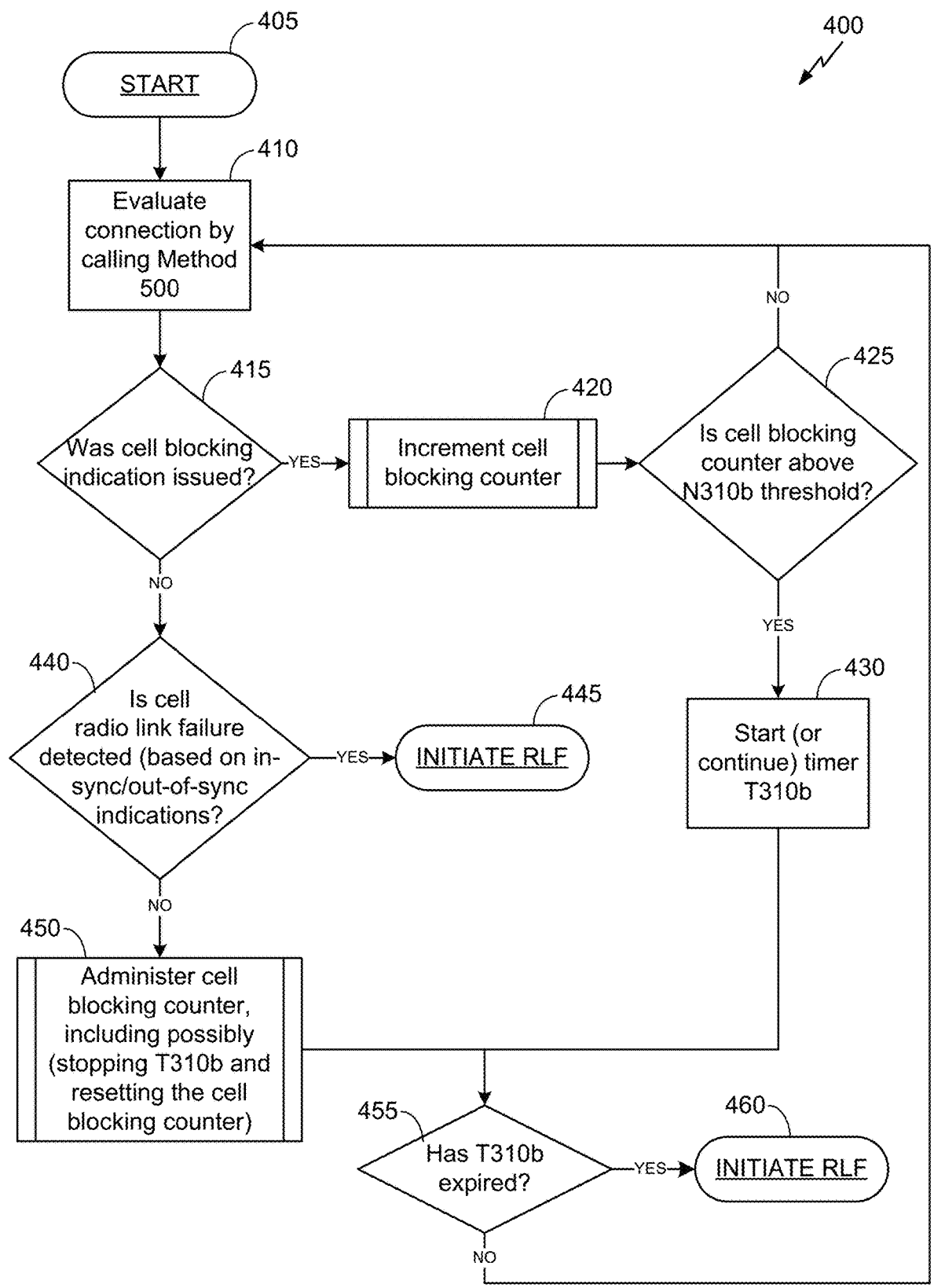
FIG. 4 illustrates an exemplary flowchart for a method of determining whether to initiate a radio link failure procedure, in accordance with an embodiment.

FIG. 4 illustrates an exemplary flowchart for a method 400 of determining whether to initiate a radio link failure procedure, in accordance with an embodiment. Some aspects of the method 400 may be implemented by the UE 106a. However, as would be understood by one of ordinary skill in the art, the method 400 or some variation thereof may be implemented by one or more other suitable electronic devices, such as wireless devices 202 of FIG. 2, the eNB 104 of FIG. 1, or any of the UEs 106 of FIG. 1. Although blocks may be described as occurring in a certain order, the blocks can be reordered, blocks can be omitted, and/or additional blocks can be added.

As illustrated, the method 400 may start at start block 405, where a UE 106a, for example, may start a determination of whether a blocking condition has occurred. Method 400 may then move to block 410, where the UE 106a, for example, may evaluate its connection to a cell (e.g., an eNB 104), by calling method 500. Various methods for evaluating the UE 106 connection to the cell are contemplated. In some aspects, the UE 106a may utilize one or more of a physical layer (referred to herein as "L1"), a medium access control (MAC) layer (referred to herein as "L2"), or a network layer (referred to herein as "L3") to implement portions of the RLM methods described herein. For example, L1 may filter certain signals to assess a quality of wireless communications from other devices, and L3 may determine whether to initiate an RLF procedure based on the assessments of L1.

Once the connection to the cell is evaluated, method 400 may then move to decision block 415, where the UE 106a, for example, may decide whether a cell blocking indication was issued in method 500. If the cell was detected (e.g., based on one of the determination methods described above), then method 400 may then move to block 420, where the UE 106a, for example, may increment a cell blocking counter. For example, in an embodiment, if the UE 106a determines that the cell undergoes blocking, then the UE 106a (e.g., L1) may increment the value of a cell blocking counter to keep track of the number of subsequent cell blocking indications that occur.

Method 400 may then move to decision block 425, where the UE 106a, for example, may determine whether the current value of the cell blocking counter is above a threshold. The threshold, here named N310b, may by hard coded in the UE 106a, or signaled by the network (e.g., the eNB 104).

If the current value of the cell blocking counter is not above the threshold, then method 400 may then return to block 410, and proceed as described above. Alternatively, if the current value of the cell blocking counter is above the threshold, then method 400 may then move to block 430, where the UE 106a, for example, may start a timer T310b, if this timer is not already running. The timer may be utilized such that the UE 106a allows for a certain amount of time to elapse before initiating an RLF procedure. This may be beneficial, for example, if the eNB 104 was only temporarily blocked from obtaining access to transmit on the wireless medium, as RLF procedures and connecting to a new cell can take time to execute (e.g., more time than the timer). In some embodiments, the value or configuration for time T310b may be hardcoded or configured.

Thereafter, method 400 may then move to decision block 455, where the UE 106a (e.g., L3), for example, may determine whether the time T310b has expired. If the time T310b has not expired, method 400 may then return to block 410. If the UE 106a determines at decision block 455 that the timer T310b has expired, method 400 may then move to end block 460, where the UE 106a may initiate an RLF procedure.

Referring back to decision block 415, if it is determined that a cell blocking indication was not issued (e.g., based on the evaluations described above with respect to block 410), then method 400 may instead proceed to decision block 440, where the UE 106a (e.g., L3), for example, may determine whether the UE 106a is sufficiently in-sync with the cell. In some aspects, L3 may utilize a timer value (e.g., T310) and counters (e.g., N310 or N311) to determine whether the eNB 104 is sufficiently in-sync (described in further detail below with respect to method 500 of FIG. 5). In various embodiments, the values of T310, N310, or N311 may be defined by a specification or configuration.

If it is determined that the UE 106a is presently, sufficiently in sync with the cell, then method 400 may then move to block 450, where the UE 106a (e.g., L1), for example, may determine to administer the cell blocking counter. In an example, the UE 106a may determine to reset T310b and the cell blocking counter if one or more events occur. For example, in an embodiment, the UE 106a may reset T310b and the cell blocking counter if one or more of the number of in-sync indications exceeded a threshold N311, the number of in-sync or out-of-sync indications exceeded a threshold N311b, or the number of cell detection success indications has exceeded a threshold N311c. In an embodiment, the in-sync, out-of-sync, or cell detection success indications can be generated by method 500, called in block 410. Thereafter, method 400 may proceed to decision block 455, and continue as described above.

If however, it is determined at decision block 440 that the UE 106a is presently not sufficiently in-sync with the cell, then method 400 may proceed to end block 445, where the UE 106a (e.g., L3) may initiate an RLF procedure. Thus, as part of method 400, the UE 106a may initiate an RLF procedure independently of a determination of whether blocking is occurring. Beneficially, the UE 106a may be able to connect to a new cell if the eNB 104 it is currently connected to is not providing a sufficient signal for the UE 106 to effectively receive or transmit wireless communications.

Figure 5:
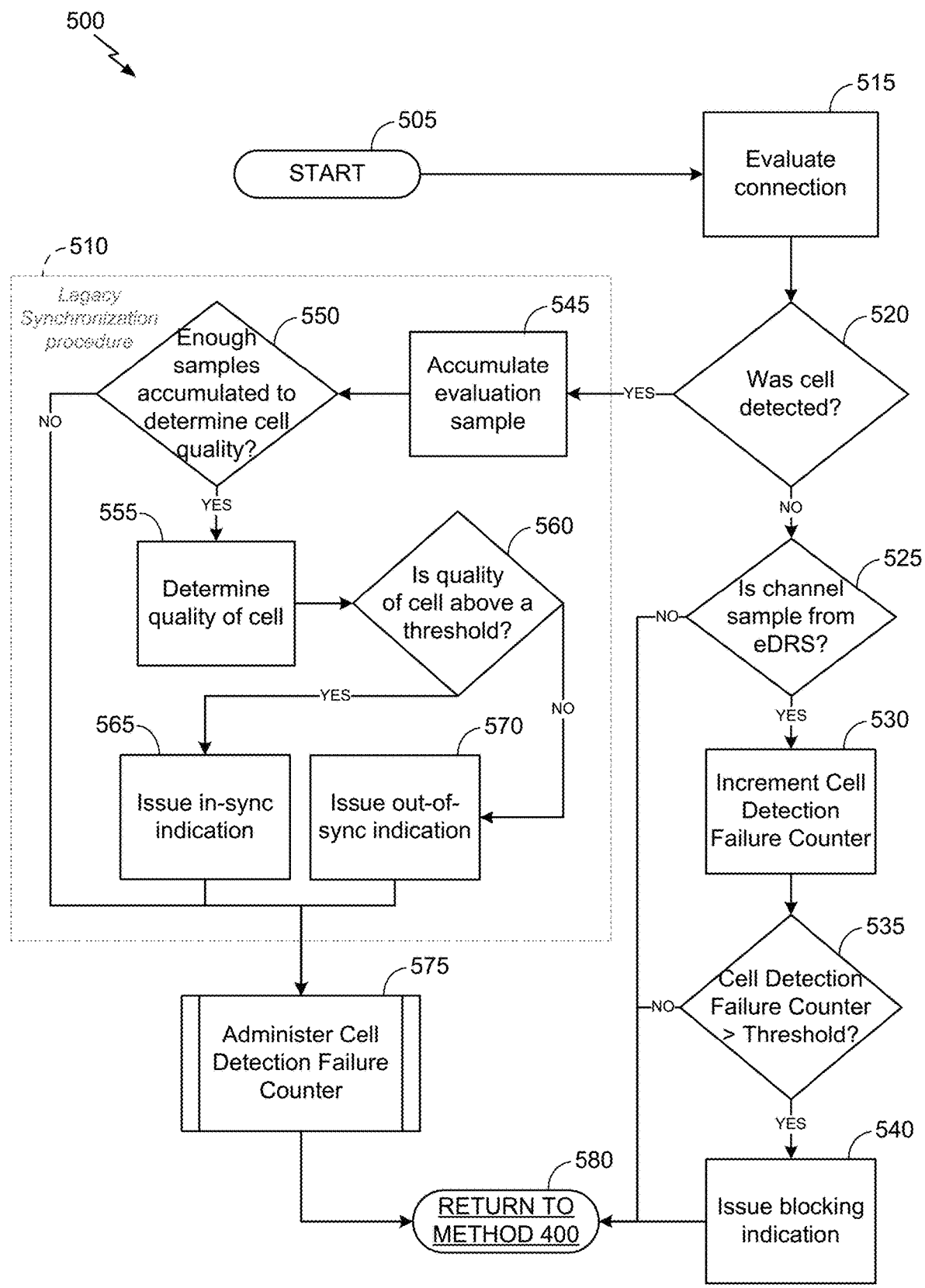
FIG. 5 illustrates an exemplary flowchart for a method of determining whether a current cell connection warrants an in-sync, out-of-sync or cell blocking indication, in accordance with an embodiment.

FIG. 5 illustrates an exemplary flowchart for a method 500 of determining whether a current cell connection warrants an in-sync, out-of-sync or cell blocking indication, in accordance with an embodiment. Additionally or alternatively, in some implementations, method 500 may also determine whether the current cell connection warrants a cell detection indication. In some implementations, method 500 runs in L1 and is invoked by method 400 running in L3. The method 500 is described as implemented by the UE 106a. However, as would be understood by one of ordinary skill in the art, the method 500 or some variation thereof may be implemented by one or more other suitable electronic devices, such as wireless devices 202 of FIG. 2, the eNB 104 of FIG. 1, or any of the UEs 106 of FIG. 1. Although blocks may be described as occurring in a certain order, the blocks can be reordered, blocks can be omitted, and/or additional blocks can be added.

Method 500 may start at start block 505 (e.g., when it is called by method 400), and may then move to block 515, where the UE 106a, for example, may evaluate its connection to the cell (e.g., eNB 104). Several embodiments for evaluating the connection are possible. For example, in an embodiment, the UE 106a may attempt to detect an eDRS signal transmitted by the eNB 104. For example, the UE 106a may listen to an unlicensed spectrum during one or more of the DMTC windows 340-348 of FIG. 3 to determine whether one or more of the sub-frames 350-359 comprises an eDRS broadcast. In an embodiment, the UE 106a may decode physical channels composing eDRS to determine whether the sub-frame comprises an eDRS broadcast. Specifically, in an embodiment, the UE 106a may listen for pilot (e.g. CRS) or synchronization (e.g. PSS, SSS) tones transmitted during one or more of the sub-frames 350-359 to determine whether the sub-frame can be identified as an eDRS broadcast. In some aspects, a pilot tone transmitted by the eNB 104 in an eDRS broadcast may have a known or otherwise identifiable structure (e.g., a known transmission power) or location (e.g., sub-frame). In certain aspects, pilot tones transmitted in single-user anchor signals have a different structure as compared to eDRS broadcast pilot tones, such as a lower transmission power. In some embodiments, the eDRS broadcast pilot tones may only be transmitted during sub-frame$_0$ 350 or sub-frame$_5$ 355. Thus, in an embodiment, the UE 106e may perform cell detection on at least sub-frame$_0$ 350 and sub-frame$_5$ 355 in a DMTC window 340-348.

In some aspects, the timing of the DMTC windows 340-348 can be indicated by a cell broadcast, or may have been previously cached. For example, in an embodiment, the timing can be cached according to an indication of a carrier, a public land mobile network (PLMN), an identifier of the cell, or some combination thereof. In some aspects, the UE 106a may only be assigned to one DMTC window 340-348 per DRX cycle. A DRX cycle may represent a paging opportunity utilized by an eNB 104 in an unlicensed spectrum to page the UEs 106 (e.g., to indicate to one or more of the UEs 106 that the eNB 104 has a message or data buffered for particular UEs 106). For example, a DRX cycle may be 1.2 sec in duration, and each transmission period 330-338 may be 120 ms in duration. This solitary assignment may be required or preferred in order to provide fairness in wireless communications in the unlicensed spectrum. However, in some embodiments, the UE 106a may be assigned to more than one DMTC window 340-348 per DRX cycle. In either event, in some aspects, the UE 106a may only perform cell detection during an assigned DMTC window 344, for example. In other aspects, however, the UE 106a may be configured to perform cell detection in other DMTC windows 340-348, even if the UE 106a is not assigned to receive data (e.g., paging information) during these windows. In some aspects, the DMTC window 344, for example, may be considered "allowed" if it falls during the on-time of a DRX timeline.

In another method of evaluating the connection to a cell (e.g., determining whether the cell is present), the UE 106a may determine one or both of a signal-to-noise ratio (SINR) or a reference signal received quality (RSRQ) of CRS transmitted on a communication channel. In an embodiment, the communication channel may be the PDCCH. As part of this method, the UE 106a may compare the determined SINR or RSRQ against a threshold below which likelihood of detection of the channel falls below a specified percentage for a particular cell configuration. In an embodiment, the threshold may be referred to as $Q_{blocking}$, and the percentage may be 50%, or some other value (e.g., defined by a configuration). Additionally or alternatively, the UE 106a may determine a channel state information specific reference (CSI-RS) SINR, and compare the result against a threshold value to determine whether the cell is detected. In some aspects, the UE 106a may combine the SINR or RSRQ of CRS in sub-frame$_0$ 350 or sub-frame$_5$ 355. This combined SINRs may then be used as part of the detection method described above, or as part of other RLM procedures (e.g., issuing in-sync or out-of-sync indications, described in further detail below).

In yet another method of evaluating the connection to a cell, the UE 106a may determine whether a PDCCH allocation for broadcast (e.g., a system information block (SIB) or enhanced SIB (eSIB)) is detected within a DMTC window 340-348. As part of another, similar method of determining whether a cell is present, the UE 106a may determine whether a broadcast (e.g., eSIB) is successfully decoded within a DMTC window 340-348. For example, in an embodiment, the UE 106a may utilize cyclic redundancy check (CRC) information to decode the broadcast. In accordance with one of both of these detection methods, the UE 106a may monitor sub-frames other than sub-frame$_0$ 350 or sub-frame$_5$ 355.

Once the connection is evaluated, method 500 may then move to decision block 520, where the UE 106a (e.g., L1 or L3), for example, may decide whether the cell was detected. If the cell was not detected, then method 500 may then move to decision block 525, where the UE 106a, for example, may determine whether the current channel sample should be detectable, by virtue of being at least one sample in DMTC.

If it is determined at decision block 525 that the channel sample is not to be considered for cell detection purposes, then the method 500 may then move to the end of method 500 and return to method 400. If instead, at decision block 525, the UE 106a determines that the sample can be used for cell detection purposes, then method 500 may then move to block 530 where a cell detection failure counter is incremented. Thereafter method 500 may move, for instance, to decision block 535, where the UE 106a determines whether the cell detection failure counter exceeded a threshold. If the threshold is exceeded, method 500 may issue a blocking indication in block 540. Method 500 may then return control to method 400. If the threshold is determined to not have been exceeded, then method 500 may also return control to method 400.

If, at decision block 520, a cell was detected, method 500 can proceed to subroutine 510, where the UE 106a, for example, can perform radio link monitoring. Such radio link monitoring may be based on a specification or a specific configuration. As illustrated, subroutine 510 may start at block 545, where the UE 106a accumulates detected cell samples. The UE 106a may accumulate such samples for ulterior in-sync or out-of-sync evaluation. Additional considerations may be accounted for. For example, separate sample accumulation may occur for eDRS samples, than for samples that are determined to be taken outside eDRS. Method 500 may then proceed, for example, to decision block 550, to determine whether a sufficient number of samples have accumulated for determining the cell quality. If an insufficient number of samples have accumulated, method 500 can end the subroutine 510, and move to block 575.

If the UE 106a determines that a sufficient number of samples have accumulated in decision block 550, then method 500 moves to block 555 where the UE 106a, for example, may determine a quality of the cell based on the accumulated samples. For example, the UE 106a may evaluate the detected cell to determine whether the eNB 104 is "in-sync" or "out-of-sync" with the UE 106a, similar to RLM in a licensed spectrum. In an embodiment, the UE 106a may determine a transmission power of one or more pilot tones transmitted over the course of a plurality of frames or sub-frames transmitted by the eNB 104. In another embodiment, measurements such as SINR or RSRQ of CRS transmitted over the course of a plurality of frames or sub-frames transmitted by the eNB 104 may be determined. In certain aspects, depending on whether the UE 106a is accumulating samples separately in different classes (e.g. eDRS samples, non-eDRS samples, or—further for non-eDRS samples—samples where the UE 106a is scheduled to receive data and samples where the UE 106a is not scheduled to receive data), the determination in decision block 550 may occur in parallel for multiple classes.

Once the quality of the cell is determined, method 500 may then move to decision block 560, where the UE 106a, for example, may decide whether the determined quality of the cell is above a threshold. For example, the measurements taken at block 555 may be accumulated over a period of time (e.g., 160 ms), and the quality of the pilot tones may be compared against a threshold value to determine whether the eNB 104 is in-sync or out-of-sync with the UE 106a during the period. Based on this determination, the UE 106a may issue an out-of-sync indication or an in-sync indication. This threshold may also be similar to one or more of the thresholds noted above with respect to FIG. 4.

If the determined quality of the cell is above the threshold, then method 500 may then proceed to block 565, where the UE 106*a*, for example, may issue an in-sync indication. For example, in an embodiment, L1 may issue an in-sync indication to L3. If instead, at decision block 560, the determined quality of the cell is not above the threshold, then method 500 may then move to block 570, where the UE 106*a*, for example, may issue an out-of-sync indication. For example, in an embodiment, the UE 106*a* may determine that it is presently out-of-sync with the eNB 104 if the average transmission power of the pilot tones is below 60% of an expected transmission power. In some aspects, L1 may issue an out-of-sync indication to L3.

After blocks 565 or 570, method 500 may then move to block 575, where the UE 106*a* handles the administration of the cell detection failure counter. For example, UE 106*a* may determine to reset the cell detection failure counter, possibly based on the observation of a pre-configured or hardcoded threshold of samples where the UE 106*a* detected the cell. Furthermore, the UE 106*a* may also issue a cell detection success indication to higher layers, when such a threshold is crossed. After handling block 575, method 500 may then move to end block 580, where the UE 106*a*, for example, may return to method 400 of FIG. 4.

In some aspects, the UE 106*a* may additionally or alternatively perform some of the RLM evaluations described herein on sub-frames outside of DRS in a DMTC window 340-348. In an embodiment, sub-frames determined by the UE 106*a* to be unicast (e.g., sub-frames outside of sub-frame$_0$ 350 and sub-frame$_t$ 355, which share scrambling) are considered outside of DRS in the DMTC window 340-348. For example, CRS (or CSI-RS) evaluation may be performed on any of the sub-frames 350-359 within the DMTC window 344, for example, containing CRS (or CSI-RS) signals, or at least a portion thereof. Thus, the UE 106*a* may not be limited to evaluating DRS in the DMTC window. Similarly, in another embodiment, the UE 106*a* may also monitor CRS (or CSI-RS) in sub-frames outside of the DMTC windows 340-348. In some aspects, these sub-frames may generally be unicast transmissions. Furthermore, a transmission power of CRS within these unicast transmissions may not be available in some aspects.

For example, in an embodiment, a threshold similar to $Q_{blocking}$ described above may be utilized outside of DRS in the DMTC window 344 or outside of the DMTC window 344, for example, only for determining whether the UE 106*a* should issue in-sync or out-of-sync indications. Thus, in accordance with this embodiment, the threshold might not be utilized to generate blocking indications (e.g., to L3). In similar embodiments, if samples are collected outside of DRS in the DMTC windows 340-348, then values for $Q_{out}$ or $Q_{in}$ (e.g., threshold values for determining whether to issue an in-sync or an out-of-sync indication) may be decreased proportionate to an expected difference in CRS transmission power between DRS and non-DRS sub-frames 350-359. In an embodiment, this difference may be obtained from an eNB 104 higher layer (e.g. broadcast or unicast signaling), may be derived in the course of operation of the UE 106*a*, or may be hard-coded in a specification or configuration. Outside of the DRS, the interference contribution from other same-operator LTE-U cells may scale similar to the signal contribution from the cell whose radio link is monitored (e.g., eNB 104), and therefore may be utilized. However, interference contribution from other sources is not expected to scale the same way as the signal.

In certain aspects, the UE 106*a* may additionally or alternatively determine whether to issue in-sync or out-of-sync indications based on unicast frames separately from determining whether to issue in-sync or out-of-sync indications based on DRS frames inside of DMTC windows 340-348. For example, the UE 106*a* may maintain separate counts of in-sync or out-of-sync indications for DRS inside of the DMTC windows 340-348 and counts of in-sync or out-of-sync indications for CRS (or CSI-RS) outside of DRS in the DMTC windows 340-348. In accordance with this embodiment, the UE 106*a* (e.g., L1) may separately signal these indications to higher layers (e.g., L3) in parallel, and the higher layers may process the signals separately. In other aspects, the UE 106*a* may combine the separate measurements of CRS (or CSI-RS) inside and outside of DRS in a DMTC window, and compare them against $Q_{in}$ or $Q_{out}$ thresholds for CRS (or CSI-RS) outside of DRS in the DMTC window.

In some aspects, SINR samples can be taken across and combined across the entire signal bandwidth, or at least a portion thereof. Thus, in some embodiments, the UE 106*a* may combine DRS observations in the same DMTC window across different carriers. For example, if there are four carriers and two DRS sub-frames per carrier, then two RLM samples may be collected based on the combination. In another embodiment, the UE 106*a* may individually count each DRS observation in DMTC windows across different carriers. For example, if there are four carriers and two DRS sub-frames per carrier, then eight RLM samples may be collected. In other embodiments, the UE 106*a* may combine observations that occur in the same sub-frames across multiple carriers, regardless of whether the sub-frames are in a DMTC window or are DRS. In some aspects, a sample may only be combined if CRS is detected in the sub-frame (e.g., based on $Q_{blocking}$ or a similar threshold). In each of the methods of combining described above, the UE 106 may utilize one or more of soft combining, hard combining, or select combining.

Figure 6:
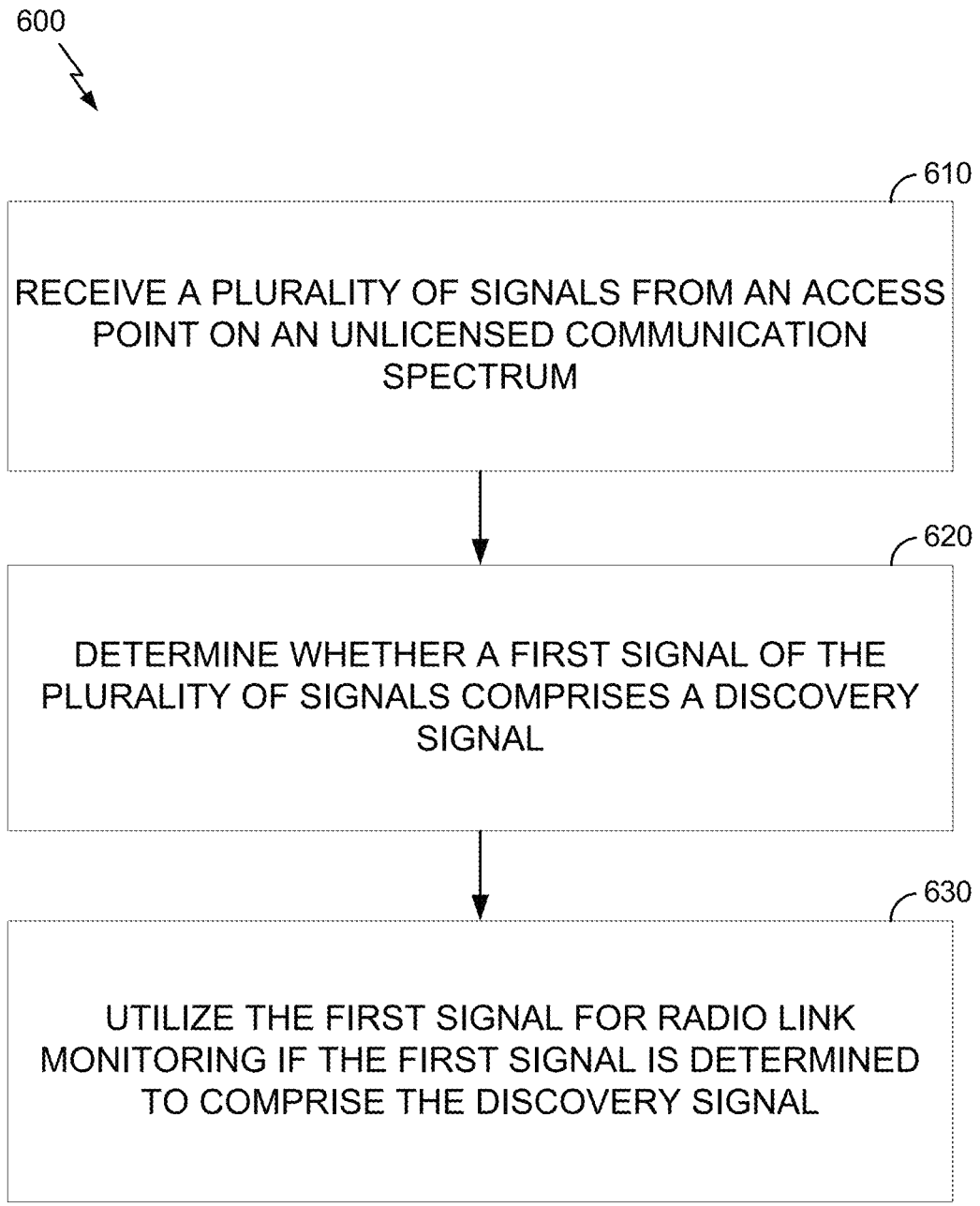
FIG. 6 illustrates a flowchart of an exemplary method of wireless communication, in accordance with an embodiment.

FIG. 6 is another flowchart of an exemplary method 600 of wireless communication, in accordance with an embodiment. The method 600 is described as implemented by the UE 106 (also referred to as a long term evolution unlicensed (LTE-U) device). However, as would be understood by one of ordinary skill in the art, the method 600 or some variation thereof may be implemented by one or more other suitable electronic devices, such as wireless devices 202 of FIG. 2, or the eNB 104 of FIG. 1. Although blocks may be described as occurring in a certain order, the blocks can be reordered, blocks can be omitted, and/or additional blocks can be added.

At operation block 610, the UE 106*a*, for example, may receive a plurality of signals from an eNB 104 (also referred to as an access point) on an unlicensed communication spectrum. The UE 106*a* may be a LTE-U device.

At operation block 620, the UE 106*a*, for example, may determine whether a signal of the plurality of signals comprises a discovery signal. In an embodiment, the discovery signal comprises at least one pilot tone. In another embodiment, the discovery signal comprises at least one synchronization tone. In some aspects, determining whether the signal of the plurality of signals comprises the discovery signal comprises one or more of determining whether a SINR of the signal is greater than an SINR threshold, determining whether a PDCCH allocation is present within the signal, or determining whether the PDCCH can be decoded.

In some aspects, block 620 may examine more than just the signal in the plurality of signals for the discovery signal. Some aspects of block 620 may include signaling a blocking indication to a higher layer of a protocol stack of the LTE-U device if the discovery signal is not detected in a predetermined number of signals of at least a portion of the plurality of signals. Similarly, a blocking signal may be generated if the discovery signal is not detected in at least a predetermined percentage of time in at least a portion of the plurality of signals. In some aspects, the blocking signal discussed above may be utilized by process 400, discussed above with respect to FIG. 4. For example, if a blocking signal is generated, process 400 may move from decision block 415 to block 420.

In some aspects, block 620 may examine discovery reference signals for the discovery signal. The discovery reference signals may be broadcast by an access point in a downlink monitoring transmission configuration (DMTC) window. The DMTC window may be assigned to the US 106a device based on a discontinuous reception period.

In some aspects, if a threshold number of in-sync or out-of-sync indications are not observed within a period of time, for example, as described by FIG. 4 above, a radio link failure (RLF) protocol may be initiated. The RLF protocol may also be initiated if a second threshold number of in-sync indications are not observed within the period of time. In some aspects, a timer may be initiated to track the number of indications received within the period of time. In some aspects, process 600 may utilize process 500, discussed above with respect to FIG. 5, to determine whether to perform a RLF procedure.

In some aspects of block 620, the signal is a first signal, and these aspects determine whether a second signal of the plurality of signals includes a second pilot tone. In some aspects, the first signal is a first sub-frame that occurs within a downlink monitoring transmission configuration (DMTC) window. In some aspects, the second signal is a sixth sub-frame occurring within the DMTC window. In some aspects, with both the first and second signals include the first and second pilot tones as discussed above, a signal to noise ratio for the first and second signals is determined. A combined signal may be determined based on the signal to noise ratios for the two signals.

Some aspects of block 620 may determine whether the pilot tone is present in the signal based on whether a signal to noise ratio of the signal is greater than a SINR threshold, and whether a physical dedicated control channel (PDCCH) allocation, if present, can be decoded from the signal. For example, the PDCCH may include a CRC value that indicates whether the channel can be decoded.

In some aspects of block 620, pilot tones are detected in sub frames that are received outside of DRS in a downlink monitoring transmission configuration (DMTC) window. These detected pilot tones are utilized for radio link monitoring in some aspects. This may include determining whether to issue in-sync or out-of-sync indications based on the at least the portion of sub frames outside of DRS, and separately determining whether to issue in-sync or out-of-sync indications based on at least a portion of sub frames that were include in the DRS broadcast.

In some aspects, the measurements, such as the SINR of each of the plurality of pilot tones are adjusted by a factor expected difference in transmission power between the DRS broadcast and the plurality of sub-frames that do not contain the DRS broadcast. In some aspects, the factor is signaled to the UE 106a device from the access point or derived by the UE 106a. In some of these aspects, the plurality of pilot tones occur outside of discovery reference signals transmitted in a downlink monitoring transmission configuration (DMTC) window assigned to the UE 106a. Alternatively, the plurality of pilot tones occur inside of discovery reference signals transmitted in a downlink monitoring transmission configuration (DMTC) window assigned to the UE 106a.

At operation block 630, the UE 106a, for example, may utilize the signal for RLM if the signal is determined to comprise the discovery signal. Additionally or alternatively, method 600 may comprise excluding the signal from the RLM if the signal is determined to not comprise the discovery signal. In other words, the RLM may be performed based on other signals besides the signal. For example, a remaining portion of the plurality of signals may be utilized. In some aspects, the RLM comprises signaling an out-of-sync indication to a higher layer of a protocol stack of the UE 106a if an observed quality of at least a portion of the plurality of signals is below a threshold, and signaling an in-sync indication to the higher layer if the observed quality is above the threshold.

In some aspects, method 600 may additionally or alternatively comprise initiating an RLF procedure if the discovery signal is not detected in at least a portion of the plurality of signals before a predetermined time elapses. In some aspects, method 600 may additionally or alternatively comprise signaling a blocking indication to a higher layer of a protocol stack of the UE 106a if the discovery signal is not detected in a predetermined number of signals of at least a portion of the plurality of signals. In some aspects, method 600 may additionally or alternatively comprise signaling a blocking indication to a higher layer of a protocol stack of the UE 106a if the discovery signal is not detected at least a predetermined percentage of time in at least a portion of the plurality of signals. In an embodiment, the portion of the plurality of signals are DRSs broadcast signals by the eNB 104 within a DMTC window. In an embodiment, the DMTC window is assigned to the UE 106a based on a DRX period.

In some aspects, method 600 may additionally or alternatively comprise initiating a timer if a threshold number of blocking indications are observed, and one or more of initiating an RLF protocol if a first threshold number of in-sync or out-of-sync indications are not observed before an expiration of the timer, or initiating the RLF protocol if a second threshold number of in-sync indications are not observed before the expiration of the timer. In certain aspects, method 600 may additionally or alternatively comprise determining, by the UE 106a, whether a second signal of the plurality of signals comprises a second discovery signal. In some aspects, the signal is a first sub-frame (e.g., sub-frame$_0$) occurring within a DMTC window, and the second signal is a sixth sub-frame (e.g., sub-frame$_5$) occurring within the DMTC window. In an embodiment, method 600 can further comprise measuring and combining a SINR of the first and second signals if the signal is determined to comprise the discovery signal and the second signal also is determined to comprise the second discovery signal. The combined SINR may be utilized for radio link monitoring.

In some aspects, method 600 may additionally or alternatively comprise measuring a plurality of discovery signals in at least a portion of a plurality of sub-frames that do not contain a DRS broadcast by the eNB 104 in a DMTC window, and utilizing the at least the portion of sub-frames for RLM. In an embodiment, utilizing the at least the portion of sub-frames for RLM comprises determining whether to issue in-sync or out-of-sync indications based on the at least the portion of sub-frames that do not contain the DRS broadcast, and separately determining whether to issue in-sync or out-of-sync indications based on at least a portion of sub-frames that do contain the DRS broadcast. In a similar embodiment, method 600 can further comprise adjusting the measurements of the plurality of discovery signals by a factor expected difference in transmission power between the discovery reference signal (DRS) broadcast and the plurality of sub-frames that do not contain the DRS broadcast. In some aspects, the factor is signaled to the UE 106*a* from the eNB 104 or derived by the UE 106*a*.

In some aspects, method 600 may additionally or alternatively comprise evaluating a SINR of a plurality of discovery signals across a plurality of carriers, combining the evaluated SINR of the plurality of discovery signals, and utilizing the combined SINR for radio link monitoring. In an embodiment, the plurality of discovery signals can occur outside of a DMTC window assigned to the UE 106*a*. In another embodiment, the plurality of discovery signals occur outside of DRS transmitted in a DMTC window assigned to the UE 106*a*. In yet another embodiment, the plurality of discovery signals occur inside of DRS transmitted in a DMTC window assigned to the UE 106*a*.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. In some aspects, the means for receiving may comprise one or more of the receiver 212, the transceiver 214, the DSP 220, the processor 204, the memory 206, the signal detector 218, the LTE modem 234, or equivalents thereof. In some aspects, means for transmitting may comprise one or more of the transmitter 210, the transceiver 214, the DSP 220, the processor 204, the memory 206, the LTE modem 234, or equivalents thereof. In some aspects, the means for determining, means for utilizing, means for excluding, means for signaling, means for initiating, means for initiating, means for measuring, means for separately determining, means for adjusting, means for deriving, means for combining, or means for evaluating may comprise one or more of the DSP 220, the processor 204, the memory 206, the user interface 222, the LTE modem 234 or equivalents thereof.

Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of wireless communication comprising:
   receiving, by a device, a plurality of signals from an access point on an unlicensed communication spectrum;
   determining, by the device, whether a first signal of the plurality of signals comprises a first discovery signal based on a quality of the first signal, wherein the first signal is a sub-frame occurring within a downlink monitoring transmission configuration (DMTC) window;
   determining, by the device, whether a second signal of the plurality of signals comprises a second discovery signal based on a quality of the second signal, wherein the second signal is a different sub-frame occurring within the DMTC window than the subframe window of the first signal;
   monitoring, by the device, a radio link based on a combination of the quality of the first signal and the quality of the second signal if the first signal is determined to comprise the first discovery signal and the second signal is determined to comprise the second discovery signal; and
   generating a blocking indication in response to being unable to determine that the first signal comprises the first discovery signal and that the second signal comprises the second discovery signal.

2. The method of claim 1, further comprising monitoring the radio link based on other signals if either the first signal or the second signal is determined to not comprise the first discovery signal or the second discovery signal, respectively.

3. The method of claim 2, wherein the monitoring the radio link comprises:
   signaling an out-of-sync indication to a higher layer of a protocol stack of the device if an observed quality of at least a portion of the plurality of signals is below a threshold; and
   signaling an in-sync indication to the higher layer if the observed quality is above the threshold.

4. The method of claim 1, wherein at least one of the first discovery signal and the second discovery signal comprises at least one pilot tone or one synchronization tone.

5. The method of claim 1, further comprising initiating a radio link failure procedure if at least one of the first discovery signal and the second discovery signal is not detected in at least a portion of the plurality of signals before a predetermined time elapses.

6. The method of claim 5, wherein the portion of the plurality of signals are discovery reference signals (DRS) broadcast by the access point in the DMTC window, wherein the DMTC window is assigned to the device based on a discontinuous reception period.

7. The method of claim 5, further comprising:
   initiating a timer if a threshold number of blocking indications are observed; and one or more of:
      initiating a radio link failure (RLF) protocol if a first threshold number of in-sync or out-of-sync indications are not observed before an expiration of the timer; and
      initiating the RLF protocol if a second threshold number of in-sync indications are not observed before the expiration of the timer.

8. The method of claim 1, wherein the sub-frame for the first signal is a first sub-frame, and wherein the different sub-frame for the second signal is a sixth sub-frame.

9. The method of claim 8, wherein the combination is a combination of:
   a signal-to-noise ratios (SINRs) of the first and second signals if the first signal is determined to comprise the first discovery signal and the second signal is determined to comprise the second discovery signal; and
   wherein monitoring the radio link is based on the combined SINRs.

10. The method of claim 1, wherein determining whether the first signal of the plurality of signals comprises the first discovery signal based on the quality of the first signal comprises one or more of:
    determining whether a signal-to-noise ratio (SINR) of the first signal is greater than an SINR threshold;
    determining whether a physical dedicated control channel (PDCCH) allocation is present within the first signal; and
    determining whether the PDCCH allocation can be decoded.

11. The method of claim 1, further comprising:
    determining signal to noise ratios (SINRs) for a plurality of discovery signals in at least a portion of a plurality of sub-frames that do not contain a discovery reference signal (DRS) broadcast by the access point in the DMTC window; and
    monitoring the radio link based on the at least the portion of the plurality of sub frames and the signal to noise ratios.

12. The method of claim 11, wherein monitoring the radio link based on the at least the portion of the plurality of sub-frames comprises:
determining whether to issue in-sync or out-of-sync indications based on at least a portion of the plurality of sub-frames that contain the DRS broadcast; and
determining whether to issue in sync or out of sync indications based on a remaining portion of the plurality of sub-frames.

13. The method of claim 11, wherein monitoring the radio link based on the at least the portion of the plurality of sub-frames comprises:
determining whether to issue in-sync or out-of-sync indications based on at least a portion of the plurality of sub-frames outside the DMTC window; and
separately determining whether to issue at least one of in-sync or out-of-sync indications based on the at least a portion of the plurality of sub-frames outside the DMTC window.

14. The method of claim 12, further comprising:
adjusting the signal to noise ratios of the plurality of discovery signals based on a difference in transmission power between the DRS broadcast and the plurality of subframes that do not contain the DRS broadcast.

15. The method of claim 1, further comprising:
combining signal to noise ratios (SINR) of the first and second signals across a plurality of carriers; and
monitoring the radio link based on the combined SINR.

16. The method of claim 15, further comprising identifying the first and second signals for the combined SINR as signals occurring outside of the DMTC window assigned to the device.

17. The method of claim 15, further comprising identifying the first and second signals for the combined SINR signal as signals occurring outside of discovery reference signals (DRS) transmitted in the DMTC window assigned to the device.

18. The method of claim 15, further comprising identifying the first and second signals for the combined SINR as signals occurring inside of discovery reference signals (DRS) transmitted in the DTMC window assigned to the device.

19. A device for wireless communication, the device comprising:
an electronic hardware processor configured to:
receive a plurality of signals from an access point on an unlicensed communication spectrum;
determine whether a first signal of the plurality of signals comprises a first discovery signal based on a quality of the first signal, wherein the first signal is a subframe occurring within a downlink monitoring transmission configuration (DMTC) window;
determine whether a second signal of the plurality of signals comprises a second discovery signal based on a quality of the second signal, wherein the second signal is a different sub-frame occurring within the DMTC window than the sub-frame window of the first signal;
monitor a radio link based on a combination of the quality of the first signal and the quality of the second signal if the first signal is determined to comprise the first discovery signal and the second signal is determined to comprise the second discovery signal; and
generate a blocking indication in response to being unable to determine that the first signal comprises the first discovery signal and that the second signal comprises the second discovery signal.

20. The device of claim 19, wherein monitoring the radio link comprises:
signaling an out-of-sync indication to a higher layer of a protocol stack if an observed quality of at least a portion of the plurality of signals is below a threshold; and
signaling an in-sync indication to the higher layer if the observed quality is above the threshold.

21. The device of claim 19, wherein the subframe for the first signal is a first sub-frame, and wherein the different sub-frame for the second signal is a sixth sub-frame.

22. The device of claim 21, wherein:
combination is a combination of signal-to-noise ratios (SINRs) of the first and second signals if the first signal is determined to comprise the first discovery signal and the second signal is determined to comprise the second discovery signal; and
wherein monitoring the radio link is based on the combined SINRs.

23. The device of claim 22, wherein the electronic hardware processor is further configured to determine whether the first signal of the plurality of signals comprises the first discovery signal based on the quality of the first signal comprises at least in part one or more of:
determining whether a signal-to-noise ratio (SINR) of the first signal is greater than an SINR threshold;
determining whether a physical dedicated control channel (PDCCH) allocation is present within the first signal; and
determining whether the PDCCH allocation can be decoded.

24. The device of claim 19, wherein the electronic hardware processor is further configured to:
determine signal to noise ratios (SINRs) for a plurality of discovery signals in at least a portion of a plurality of sub-frames that do not contain a discovery reference signal (DRS) broadcast by the access point in the DMTC window;
adjust the signal to noise ratios of the plurality of discovery signals based on a difference in transmission power between the DRS broadcast and the plurality of sub-frames that do not contain the DRS broadcast in the DMTC window, wherein the difference is signaled from the access point or derived by the processor; and
monitor the radio link based on the adjusted signal to noise ratios.

25. The device of claim 24, wherein the electronic hardware processor is further configured to monitor the radio link based on the at least the portion of the plurality of sub-frames by:
determining whether to issue in-sync or out-of-sync indications based on at least a portion of the plurality of sub-frames that contain the DRS broadcast; and
determining whether to issue in sync or out of sync indications based on a remaining portion of the plurality of sub-frames.

26. The device of claim 19, wherein the electronic hardware processor is further configured to:
combine signal to noise ratios (SINRs) of the first and second signals across a plurality of carriers; and
monitor the radio link based on the combined SINRs.

27. A device for wireless communication, the device comprising:
means for receiving a plurality of signals from an access point on an unlicensed communication spectrum;
means for determining whether a first signal of the plurality of signals comprises a first discovery signal based on a quality of the first signal, wherein the first signal is a sub-frame occurring within a downlink monitoring transmission configuration (DMTC) window;

means for determining whether a second signal of the plurality of signals comprises a second discovery signal based on a quality of the second signal, wherein the second signal is a different sub-frame occurring within the DMTC window than the sub-frame window of the first signal;

means for monitoring a radio link based on a combination of the quality of the first signal and the quality of the second signal if the first signal is determined to comprise the first discovery signal and the second signal is determined to comprise the second discovery signal; and means for generating a blocking indication in response to being unable to determine that the first signal comprises the first discovery signal and that the second signal comprises the second discovery signal.

28. A non-transitory computer-readable medium comprising instructions that, when executed, perform a method of wireless communication, the method comprising:

receiving, by a device, a plurality of signals from an access point on an unlicensed communication spectrum;

determining, by the device, whether a first signal of the plurality of signals comprises a first discovery signal based on a quality of the first signal, wherein the first signal is a sub-frame occurring within a downlink monitoring transmission configuration (DMTC) window;

determining whether a second signal of the plurality of signals comprises a second discovery signal based on a quality of the second signal, wherein the second signal is a different sub-frame occurring within the DMTC window than the sub-frame window of the first signal;

monitoring, by the device, a radio link based on a combination of the quality of the first signal and the quality of the second signal if the first signal is determined to comprise the first discovery signal and the second signal is determined to comprise the second discovery signal; and generating a blocking indication in response to being unable to determine that the first signal comprises the first discovery signal and that the second signal comprises the second discovery signal.

* * * * *